(12) United States Patent
van Beusekom et al.

(10) Patent No.: US 7,611,181 B2
(45) Date of Patent: Nov. 3, 2009

(54) GRIPPER HEAD WITH ROTATABLE GRIPPER BLADES AND ANTI-SLANT PROVISION

(75) Inventors: Hendrikus Johannes Maria van Beusekom, Hoevelaken (NL); Gerrit Doppenberg, Putten (NL)

(73) Assignee: FPS Food Processing Systems B.V. (NL)

( * ) Notice: Subject to any disclaimer, the term of this patent is extended or adjusted under 35 U.S.C. 154(b) by 154 days.

(21) Appl. No.: 11/560,965

(22) Filed: Nov. 17, 2006

(65) Prior Publication Data

US 2007/0267880 A1 Nov. 22, 2007

(30) Foreign Application Priority Data

Nov. 18, 2005 (EP) .................................. 05077637

(51) Int. Cl.
*B66C 1/42* (2006.01)
(52) U.S. Cl. ........................................ 294/88; 294/106
(58) Field of Classification Search .................. 294/88, 294/106, 86.4; 414/406
See application file for complete search history.

(56) References Cited

U.S. PATENT DOCUMENTS

| 5,092,731 | A | * | 3/1992 | Jones et al. | .................. | 294/106 |
| 5,360,310 | A | * | 11/1994 | Jones et al. | .................. | 414/409 |
| 5,463,847 | A | | 11/1995 | Alexander et al. | | |

* cited by examiner

*Primary Examiner*—Paul T Chin
(74) *Attorney, Agent, or Firm*—Stites & Harbison PLLC; Marvin Petry; Stephen J. Weyer

(57) ABSTRACT

An apparatus for picking up products or groups of products, including a gripper having a frame, two holders that are movably connected on two opposite sides of the frame, and two gripper blades that are each movably connected with an associated one of the holders. Each gripper blade has the shape of an arc with an associated axis, the two axes of the two gripper blades are situated between the two gripper blades. Guide wheels, in the form of a pinion with teeth, engage with at least one row of holes arranged on the arc of the gripper blade to thereby guide the associated blade during rotation about its axis. A first drive is provided for moving each of the holders away from and towards each other. Two second drives are connected with a respective one of the two gripper blades to rotatingly turn outwards or draw inwards the associated arcuate gripper blade. A third drive is provided for displacing the gripper frame.

9 Claims, 3 Drawing Sheets

GRIPPER HEAD WITH ROTATABLE GRIPPER BLADES AND ANTI-SLANT PROVISION

FIELD OF THE INVENTION

The present invention relates to an apparatus including a gripper for picking up products or groups of products.

BACKGROUND OF THE INVENTION

Such an apparatus is known rom EP666149. More particularly, it is described in that publication how two arcuate gripper plates on each side are passed between three guide wheels to be able to perform a rotating movement. It has been found that this movement is particularly suitable for placing products clamped between these plates or blades, for instance egg boxes with the eggs grouped in, for instance, patterns with a 2×5, 2×6, or 2×2×3 arrangement of the eggs, in matching and close-fitting outer boxes, packaging boxes, cases, or crates, and especially, after placement, after rotating away, that is, rotary drawing-in of the plates or blades, to raise the gripper from such an outer box again without damaging the outer box or leaving the egg box behind in an unwanted manner.

Both in placing the products in the outer box and in retracting just the gripper out of the outer box, the gripper blades will mostly move along the walls of the outer box with friction because the dimensions of products and outer box match closely. Depending on the materials used, or even on the condition thereof, for instance in case of much moisture, the gripper blades, as a result of this friction, may to some extent change in position between the guide wheels, or, differently stated, rack to some extent. This may be disadvantageous in subsequent cycles of picking up and placement, especially because the products may thereby be damaged. In the case of egg boxes from cardboard, this may even mean that egg breakage is to be reckoned with. The disclosure is directed at improving the prior apparatus.

SUMMARY OF THE INVENTION

In one aspect an apparatus for picking UP products or groups of products is provided that includes:
  a gripper having a frame;
  two holders moveably connected on two opposite sides of the frame;
  two gripper blades that are each moveably connected with an associated one of the holders, each gripper blade having the shape of an arc with an associated axis, the two axes of the two gripper blades being situated between the two gripper blades;
  guide wheels associated with each gripper blade and configured to guide the associated gripper blade during the rotation about its axis;
  a first drive for moving each of said holders away from and towards each other;
  two second drives each of which is connected with an associated one of the two gripper blades and configured to rotatingly turn outwards or draw inwards the associated arcuate gripper blade; and
  a third drive for displacing the gripper frame,
  wherein for each gripper blade at least a part of one of the associated guide wheels is designed as a pinion with teeth; and
  each gripper blade having at least one row of holes arranged along the arc circumferential direction of the gripper blade, the holes being engaged by the teeth of the associated pinion.

With such an apparatus, in a highly suitable manner, the gripper blades on either side of the gripper frame are rotated to the same extent, allowing the products to be engaged in a well-controlled manner without damaging them.

Further exemplary embodiments have as features
  that the pinion engages along the outer circumference of such a gripper blade;
  that the first drive for one holder is coupled with the other holder through a synchronous coupling;
  that the synchronous coupling comprises a combination of endless toothed belt with two toothed-belt guide wheels, wherein the first drive with the housing is arranged on and connected with the frame, and wherein the drive is connected with one holder and with the toothed belt, wherein the toothed belt is furthermore connected with the other holder, and wherein the toothed-belt wheels are connected with the frame;
  that at least one of the guide wheels along the inner circumference of such a gripper blade is shaft-shaped, wherein, in engaging, displacing and delivering the product or the group of products, this shaft-shaped wheel substantially abuts against the upper side of such a product;
  that the frame is provided with a stop, perpendicular to the feeding direction of the product or a group of products and situated on the downstream side of the frame viewed in the feeding direction, wherein the products upon being fed are stopped by this stop;
  that the stop is in the form of a plate;
  that the position of the stop in the conveying direction is adjustable with an adjustment connection;
  that the adjustment connection comprises a screw-slot connection; and/or
  that in engaging, displacing and delivering products or group of products while considerable seams or interruptions occur in or between products, parallel to the gripper blades and situated along the upper side in the conveying direction, the frame is connected with engagement strips which, in engaging, are positioned engagingly in the seams, recesses, or interruptions and, upon delivering, are removed from the seams or interruptions.

BRIEF DESCRIPTION OF THE DRAWINGS

The gripper according to the invention will be described in detail with reference to the following figures,
  wherein FIG. 1 schematically shows an exemplary embodiment in isometric view,
  wherein.

DETAILED DESCRIPTION OF THE DRAWINGS

Figure 1:
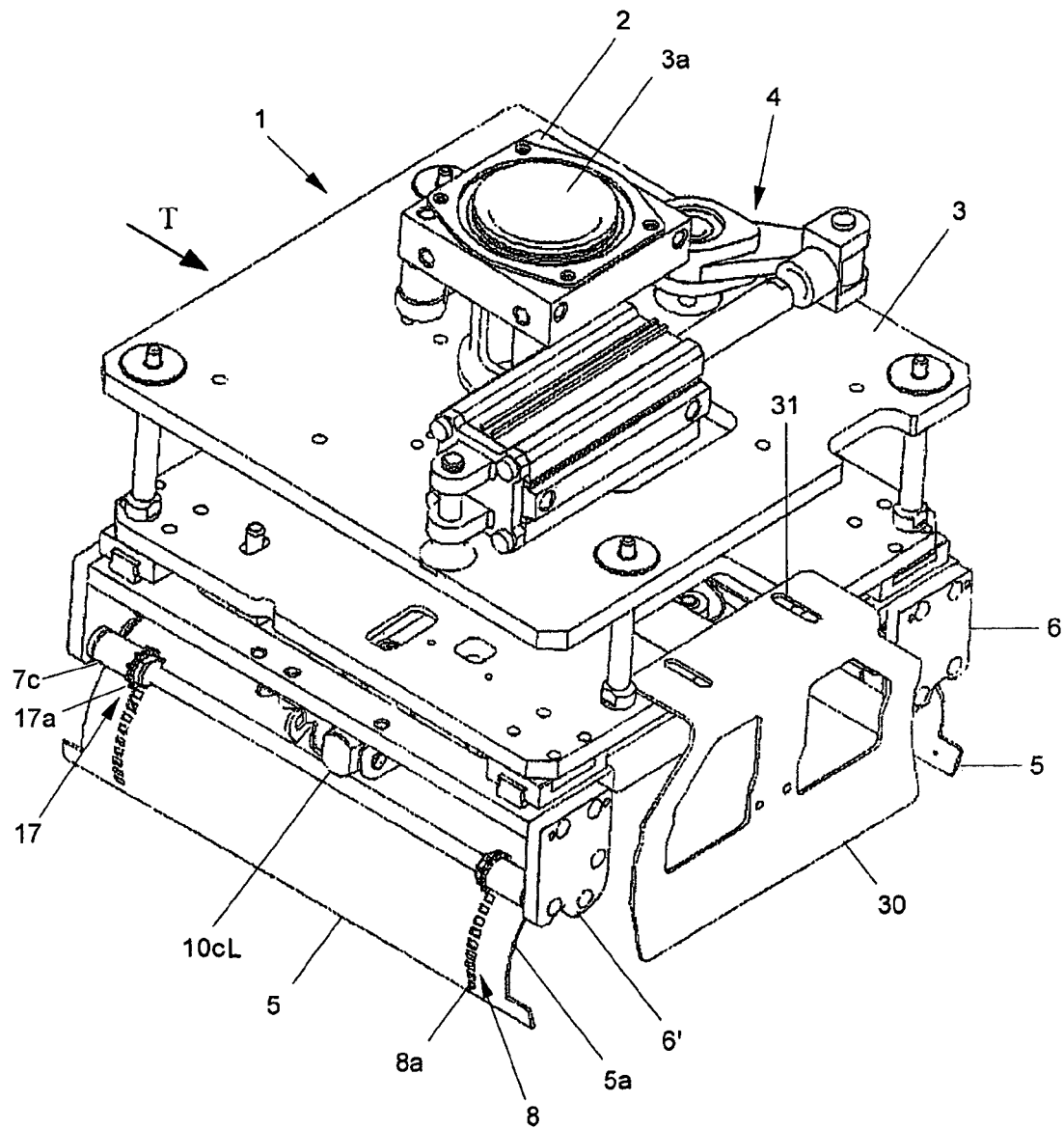

In the different figures, corresponding parts have been given the same reference characters.

Figure 3:
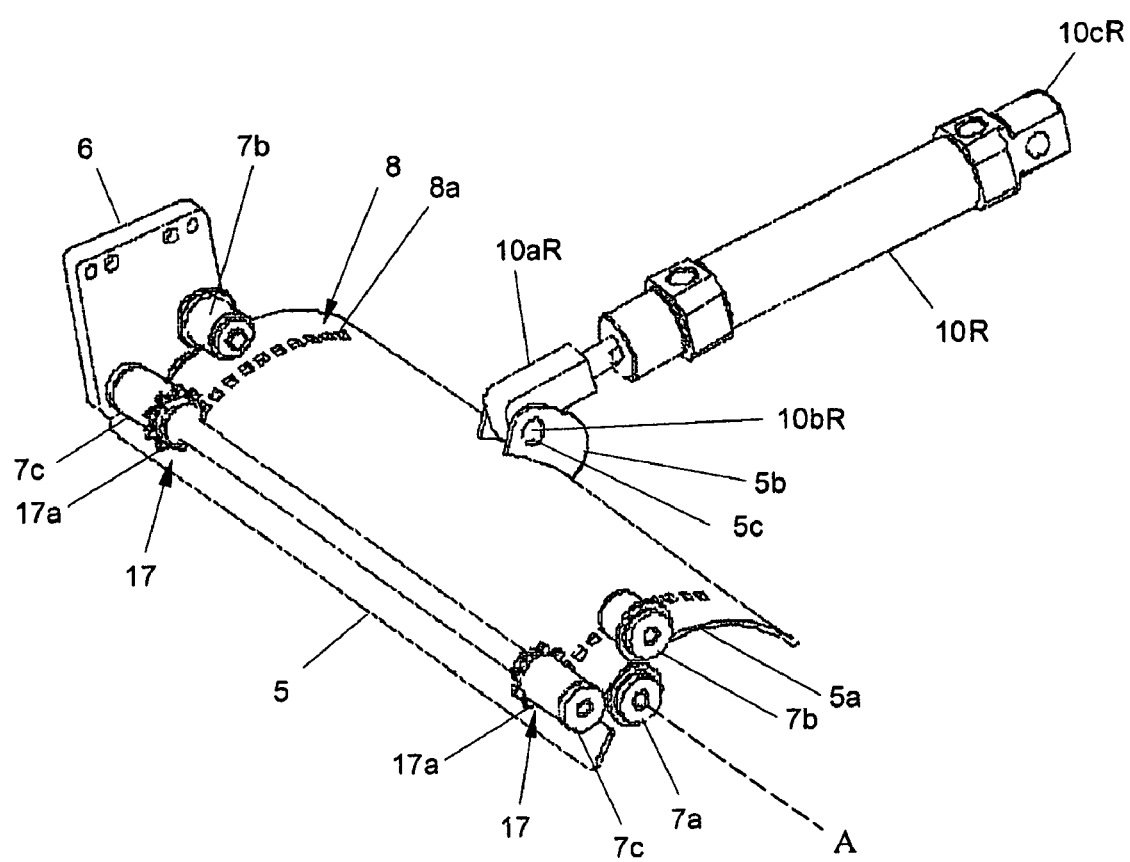

In FIG. 1, gripper 1 is mounted on the lower end of a boom or mast 2 which can be moved up and down to pick up and put down loads. More particularly, this gripper 14 comprises a frame 3 which can be rotated with a rotation mechanism 4 by means of a shaft 3a in the boom 24. In this way, in certain cases, products will be picked up and set down that have been rotated a quarter turn with respect to a previous cycle. The gripper is equipped with a pair of gripper blades 5, each arranged in an associated holder 6, each on a side of the frame 3. The gripper blades are arcuate, as represented by an arc 5a, and, when being rotated outwards or drawn in, are rotatably passed round by guiding them between sets of, in each case, three guide wheels 7a, 7b, 7c, with rotation taking place about axes A as indicated in FIG. 3. It will be clear to those skilled in the art that the curvature is such that the axes A are situated between the blades.

For the movements as mentioned above, several drives are needed to execute a cycle of engaging, clamping, displacing, and delivering. For these movements, several slightly different sequential orders can be chosen. Such choice is generally determined by reasons of efficiency, which are generally a combination of adequate space and required and available time. It will be clear to those skilled in the art that such a cycle is realized in a generally known manner by a control, more particularly by a computer program that executes the signal control.

A first drive 9 is used for moving the holders 6, 6' away from or towards each other. As soon as a product, or a group of products, has been positioned in the correct position under the gripper 1, the gripper 1 will be moved down to the proper height, and the holders 6, 6', after the gripper blades 5 have been rotated outwards, will be moved towards each other until the product, or the group of products, is clamped firmly enough. Similarly, after placement in an outer box, and after complete upward retraction out of the outer box, the holders 6, 6' will be moved away from each other to allow a next cycle to be started.

Figure 2:
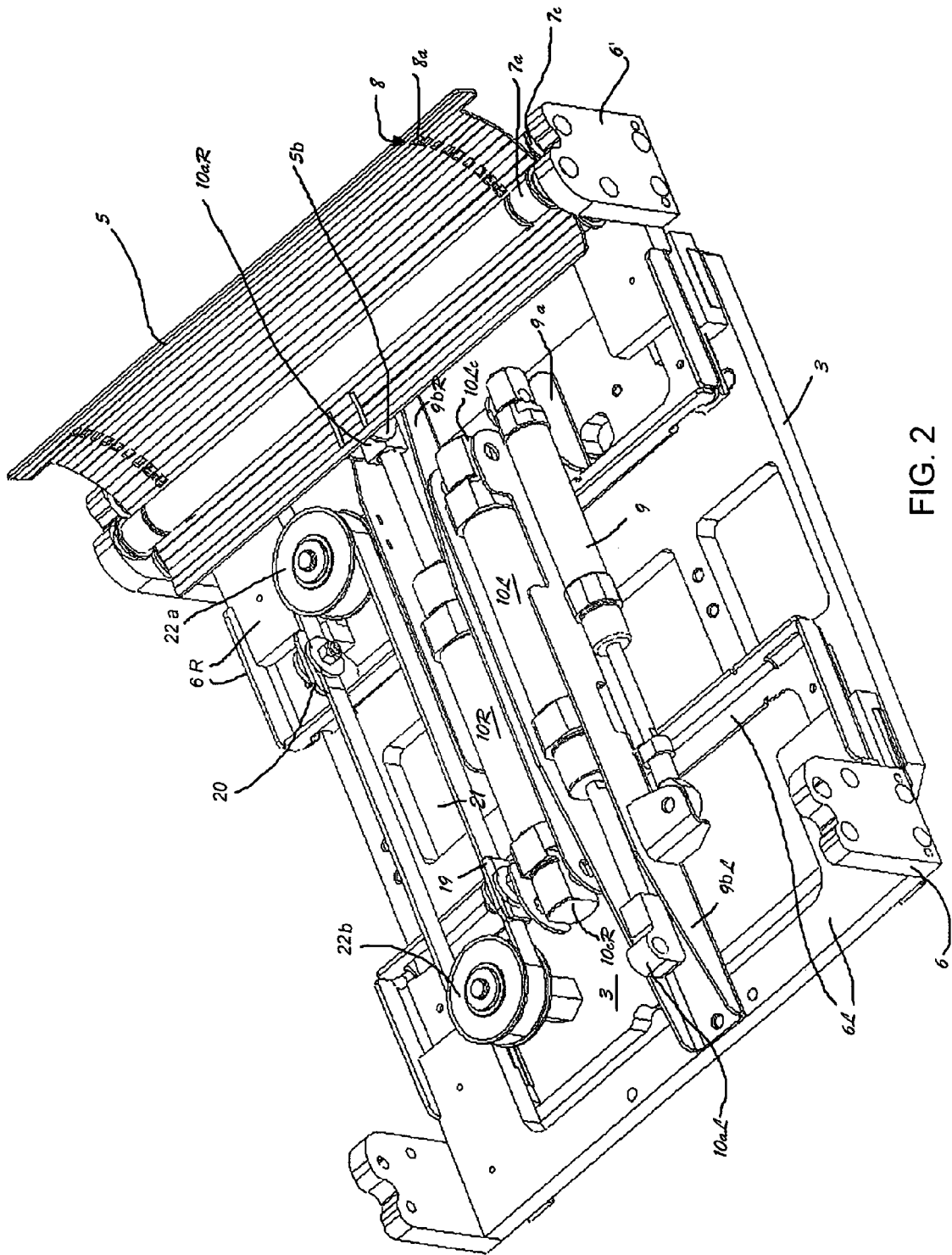
FIG. 2 represents in isometric view a view of the first drive for the exemplary embodiment from FIG. 1, and
  wherein FIG. 3, for this exemplary embodiment, shows in isometric view one of the gripper blades, and the guide and drive thereof.

Further details of this first drive 9 are indicated in FIG. 2, where, in this exemplary embodiment, the first drive 9 is realized pneumatically, with the first drive 9 being connected directly with one holder 6 through a bracket 6L via an associated first carrier 9bL. Further, this first drive 9 is connected by means of a foot 9a of a drive housing of the first drive 9 to the frame 3. To cause the other holder 6 to be moved as well, simultaneously, and, after adjustment, in a centered manner, the bracket 6L is connected via a coupling piece 19 with a first part of an endless toothed belt 21. An opposite part of this toothed belt 21 is connected via a second coupling piece 20 with a second bracket 6R on the other holder 6'. The second bracket 6R is connected with an associated second carrier 9bR. As is indicated in FIG. 2, the toothed belt 21 is passed over two toothed-belt wheels 22a,b whose axles are rotatably connected with the frame 3. What is achieved with great advantage in this way is that with well-controlled feeding of the products a highly uniform engagement, clamping, displacement, and delivery of these products is obtained. It is noted that in EP666149, for each holder a separate first drive is used.

Furthermore, it is noted that the first carrier 9bL and the second carrier 9bR of the first driving construction are each connected with an associated second drive 10L, 10R, more particularly connected with one of the ends 10c of an associated/respective second drive 10cL, 10cR. In other words, two second drives 10L, 10R are present in the gripper 1. Each second drive 10L, 10R drives the rotational movement of an associated/respective gripper blade 5. In order to simplify FIG. 2, only the gripper blade 5 associated with second drive 10R is shown, although there is a respective blade 5 associated with second drive 10L.

In FIG. 3, it is shown in detail how one of the two second drives, namely 10R is arranged. The second drive 10R is connected with an associated gripper blade 5 via an end 10aR with cross shaft 10bR adjacent a corresponding bracket 5b with shaft holes 5c in order to cause the associated gripper blades 5 to follow its rotary movement, viz. outward rotation prior to clamping and engagement, and subsequently, after placement of the product or the group of products, inward retraction. As briefly indicated above, the guidance of the gripper blades 5 is executed by sets of guide wheels 7a, 7b, 7c, generally one set on each side of such a gripper blade 5. For this guidance to proceed as uniformly as possible, of each set, one of the guide wheels is designed as a pinion 17 with teeth 17a which engage in a corresponding row 8 of holes 8a provided in the circumferential direction of such an arcuate blade 5a. The pinion 7 and the row 8 function in a generally known manner as a pinion and rack. Advantageously, the sets will be situated on a same continuous shaft, while the set, and hence the shaft, on the inner circumference, substantially abuts against a product, and with this feature too provides for further clamping, for instance of a cover part of such a product.

As already elucidated above, racking upon possible friction and jamming is thus prevented, in particular in the case where a combination as shown is provided on both sides, or also in the case where a long shaft piece with corresponding hole slots is used. In the exemplary embodiment shown, the pinion principle is used for one of the guide wheels 7a,b,c along the outer circumference of such a gripper blade 5. To those skilled in the art, it will be clear that a similar action is obtained with combinations of several gear wheels.

A third drive (not represented in the figures) is used to displace the gripper 1 as a whole, generally performing a reciprocating vertical movement, for instance by coupling the beam or mast 2 in a generally known manner to such a third drive.

Furthermore, it is indicated in FIG. 1 how products when being fed in conveying direction T can be advanced as far as a stop 30 which is connected with the frame 3 through screw-slot connections 31. As will be clear to those skilled in the art, for this purpose, suitable forms, for instance a plate, will be used.

The invention claimed is:

1. An apparatus for picking up products or group of products, the apparatus comprising:
    a gripper having a frame;
    two holders movably connected on two opposite sides of the frame;
    two gripper blades that are each moveably connected with an associated one of the holders, each gripper blade having the shape of an arc with an associated axis, the two axes of the two gripper blades being situated between the two gripper blades;
    guide wheels associated with each gripper blade and configured to guide the associated gripper blades during the rotation about its axis;
    a first drive for moving each of said holders away from and towards each other;
    two second drives of which each one is connected with an associated one of the two gripper blades and configured to rotatingly turn outwards or draw inwards the associated arcuate gripper blades;
    a third drive for displacing the gripper frame,
    wherein for each gripper blade at least a part of one of the associated guide wheels is designed as a pinion with teeth; and
    each gripper blade has at least one row of holes arranged along an arc circumferential direction of the gripper blade, the holes being engaged by the teeth of the associated pinion.

2. The apparatus according to claim 1, wherein the pinion engages along an outer circumference of an associated one of the gripper blades.

3. The apparatus according to claim 2, wherein the first drive for one holder is coupled with the other holder through a synchronous coupling.

4. The apparatus according to claim 3, wherein the synchronous coupling comprises a combination of endless toothed belt with two toothed-belt guide wheels, wherein the first drive having a first drive housing is arranged on and connected with the frame, and wherein the drive is connected with one holder and with the toothed belt, wherein the toothed belt is further connected with the other holder, and wherein the toothed-belt wheels are connected with the frame.

5. The apparatus according to claim 1, wherein at least one of the guide wheels along an inner circumference of such a gripper blade is shaft-shaped and is configured to abut against an upper side of a product that is being held by the gripper.

6. The apparatus according to claim 1, wherein the frame is provided with a stop at a side of the gripper frame that extends between the opposite sides to which the two holders are connected and configured to stop a product or a group of products that is fed to the gripper in a feeding direction, the stop being situated with respect to the feeding direction on the downstream side of the frame.

7. The apparatus according to claim 6, wherein the stop is a plate.

8. The apparatus according to claim 6, wherein the position of the stop in the feeding direction is adjustable relative to the gripper frame with an adjustment connection.

9. The apparatus according to claim 8, wherein the adjustment connection comprises a screw-slot connection.

* * * * *